United States Patent [19]

Ponce et al.

[11] Patent Number: 4,810,919
[45] Date of Patent: Mar. 7, 1989

[54] LOW-TORQUE NUTS FOR STATOR CORE THROUGH-BOLTS

[75] Inventors: Hector O. Ponce; Felix M. Detinko, both of Winter Park, Fla.

[73] Assignee: Westinghouse Electric Corp., Pittsburgh, Pa.

[21] Appl. No.: 121,815

[22] Filed: Nov. 16, 1987

[51] Int. Cl.⁴ .................. H02K 5/04; F16B 35/00; F16D 1/06
[52] U.S. Cl. .................. 310/217; 29/596; 411/393; 411/432; 310/42; 310/91
[58] Field of Search ............ 29/596, 42, 91, 217; 411/393, 427, 432

[56] References Cited

U.S. PATENT DOCUMENTS 3,618,994 11/1971 Gepfert .................. 411/432
4,622,730 11/1986 Steinbock .................. 411/432
4,660,687 4/1987 Williams et al. .................. 411/432

OTHER PUBLICATIONS

Machine Design, 11/13/86, "Threaded Fasteners"—Page 76 (vol. 58, No. 27).

Primary Examiner—Patrick R. Salce
Assistant Examiner—D. L. Rebsch

[57] ABSTRACT

A method and apparatus for compressing a stator core assembly of an electric generator having a plurality of stacked punchings positioned between opposing compression plates. A through-bolt is passed through an aperture drilled through the stacked punchings, and a tensioning nut threaded onto one end of the through-bolt. A thrust nut is threaded onto a second end of the through-bolt, thereby compressing the punchings between the tensioning nut and a thrust nut. The tensioning nut is fixed to the through-bolt so as not to be removable. The punchings are compressed by external means and then the thrust nut is tightened against the plate and peened to remain in position. Final tensioning and retensioning is provided by a plurality of set screws circumferentially placed about the thrust nut and extending parallel to the through-bolt. The set screws may be turned, cooperating against one of the compression plates to exert compressive force on the punchings. The set screws may utilize nylon inserts to prevent loosening. The utilization of the unique thrust nut with set screws allows the punchings to be retensioned after installation without requiring utilization of large tools to turn the very large thrust nut.

6 Claims, 3 Drawing Sheets

LOW-TORQUE NUTS FOR STATOR CORE THROUGH-BOLTS

This invention relates to electric power generators, and, more particularly, to an improved assembly for retensioning through-bolts used to compress stator core punchings.

BACKGROUND OF THE INVENTION

Large public utility power plants produce electricity by coupling a generator to a mechanical power source such as a steam turbine. The generator comprises a rotor journaled in a stator, the rotor containing copper coil windings which carry a direct current for producing a magnetic flux. The power source spins the rotor at high speeds, causing the magnetic flux to sweep across copper coil windings in the stator and generate an electric current.

The generator stator comprises a cylindrical core having longitudinal slots along an inner surface, each slot containing a pair of top and bottom half turn coils. The top and bottom half turn coils emerge from the longitudinal slots at each end of the stator core and turn in order to connect with other half turn coils, thus forming a coil winding. The plurality of emerging end coils at each end of a stator core form an end winding basket. This basket arrangement of individual end coils must be consolidated into a unified structure in order to restrain radial and tangential coil movements which result from large electromagnetic forces, thermal expansion and coil vibration. Bracing assemblies are commonly used to secure end coils and reduce coil wear which results from coil movement during generator operation. In order to provide sufficient mass and stiffness for reducing steady state coil vibration and other sources of coil movement, the end coil bracing assemblies must be relatively large. As a result there are very limited clearances about the end winding basket and portions of the stator core are not readily accessible for maintenance and repair.

Recent improvements in bracing assemblies which further reduce coil movement in the end winding baskets of an electrical generator have used bracing systems in which a non-metallic segmented ring is positioned against upper surfaces of top end coils and a non-metalic cone shaped support ring is positioned against lower surfaces of bottom end coils to provide a continuous rigid support about the end winding basket. These rings are formed of a relatively rigid, baked fiber glass/epoxy resin composite. In order to minimize coil movement, such support rings may be substantially larger than other bracing systems which have been used to secure end coils against movement.

The cylindrical stator core, which may exceed 300 inches in length, is formed from a plurality of stacked punchings. A series of longitudinal through-bolts extending through the entire length of stacked punchings are used to compress the punchings between a pair of end plates and consolidate them into a unified structure. This arrangement minimizes vibration and stator core deformation which result from the large electromagnetic forces present during generator operation.

Generator designs typical of the prior art utilized the through-bolt clamping arrangement illustrated in FIGS. 1 and 2 for compressing the stacked stator core punchings. FIG. 1 illustrates, in partial cutaway, a generator 11 having a rotor 13 journaled within a stator core 15 within a support frame 17. As further illustrated in the partial cross-sectional view of FIG. 2, the stator punchings 19 are sandwiched between a pair of insulation washers 21,22 and a pair of steel compression plates 23,24 to distribute the compression forces. Through-bolts 25 having first and second threaded ends 27 and 29 are positioned to extend outward through the punchings 19 and the compression plates 23,24 on both the exciter end 33 and the turbine end 35 of the generator 11.

Procedures for stressing a stator core through-bolt 25 during generator assembly have involved first installing insulation washers 21,22, compression plates 23,34, insulation bushings 45,46, washers 43,44 and tensioning nuts 41,42 on the first and second bolt ends 27 and 29. The nuts are hand tightened against the stacked punchings 19 and the steel compression plates 23,24. Next, a tensioning nut 41,42 on one bolt end, e.g. the first end 27, is locked to the through-bolt 25 by deforming the bolt threads in order to prevent the nut from backing out. Then a hydraulic tensioning tool (not illustrated) is threaded onto the other bolt end, e.g. the second end 29, over the other tensioning nut 42. The through-bolt 25 is stressed with the tensioning tool to provide a desired compressive force against the stacked punchings 19. This creates a gap between the adjacent tensioning nut 42 and compression plate 24. The nut 42 is then threaded onto the bolt 25 to remove the gap and is locked in place by deforming the bolt threads. Finally, the tensioning tool is released so that the locked tension nuts 41,42 hold the through-bolt 25 in a stressed position to retain a compressive force against the stacked punchings 19. After all the through-bolts have been installed, half turn coils are placed in the longitudinal slots of the stator core and the end coils are interconnected to form a coil winding. With the winding in place, a bracing assembly is installed at each end of the turbine to secure the end coils into a unified structure.

This general procedure used for stressing through-bolts during stator core assembly is known to have several limitations affecting preventive maintenance of the stator core 15 and the degree of tensioning which can be obtained ,for the through-bolts 25. Notwithstanding the relatively large compressive forces used to form the stator core punchings 19 into a unified structure, the deformation and vibration forces incurred during generator operation have been known to cause individual punchings to slide against one another and to wear down their insulative coatings. Progressive wear may decrease the punching thickness and reduce the compressive forces provided by the stressed through-bolts 25. This in turn may result in greater levels of movement among the punchings and accelerate the overall wear process.

One solution for preventing these wear effects is to retension the through-bolts 25 if the compressive forces diminish to unacceptable levels. This is accomplished by again applying a compressive force with a tensioning tool. Next, one of the tensioning nuts 41,42 is again threaded inward to retain the new compressive force against the punchings after the tool is removed. However, this method of retensioning stator core through-bolts has been awkward and inconvenient due to limited accessibility and the large tensioning tools which must be positioned about the through bolt nuts. The task is especially difficult for generator designs in which the support rings are relatively large.

In the past, tensioning nuts have been locked in place by deforming the nut threads, as well as the bolt threads, during factory assembly in order to prevent backing out of the nuts 41,42. However, deformities in the nut threads and bolt threads adjacent the nuts must be machined in order to thread the nuts 41,42 inward for retensioning. Therefore, it has become a common practice not to deform the nut threads and to deform only the bolt threads up to one revolution in front of the nuts 41,42. This technique alleviates having to machine the nut and bolt threads when retensioning the through-bolts 25. A disadvantage of the technique is that it allows the nuts 41,42 to back out, up to one revolution of threading when they are installed. This effect results in a small, but significant, drop in the through-bolt compressive force at the time of installation. It is therefore desirable to provide a through-bolt assembly for compressing stator core punchings which does not involve the turning of tensioning nuts when retensioning the through-bolts.

BRIEF DESCRIPTION OF THE DRAWINGS

For a better understanding of the present invention, reference may be had to the following detailed description taken in conjunctions with the accompanying drawing in which.

SUMMARY OF THE INVENTION

It is an object of the present invention to provide an improved through-bolt assembly and method for retensioning stator core through-bolts.

It is still another object of the present invention to provide a through-bolt assembly which may be retensioned without requiring the turning of tensioning nuts.

In one form, the present invention comprises a through-bolt extending through stacked punchings of a stator core, a tensioning nut threaded onto a first through-bolt end and a thrust nut having a central threaded bore for positioning on a second bolt end. The thrust nut comprises a plurality of set screws positioned about the central bore and extending through the nut parallel to the central bore. The set screws are positionable against a thrust washer in order to retension the through-bolt. The method for retensioning a stator core through-bolt with the thrust nut involves torquing the individual set screws against the thrust washer until a desired level of through-bolt tension is attained.

DETAILED DESCRIPTION OF THE INVENTION

Figure 1:
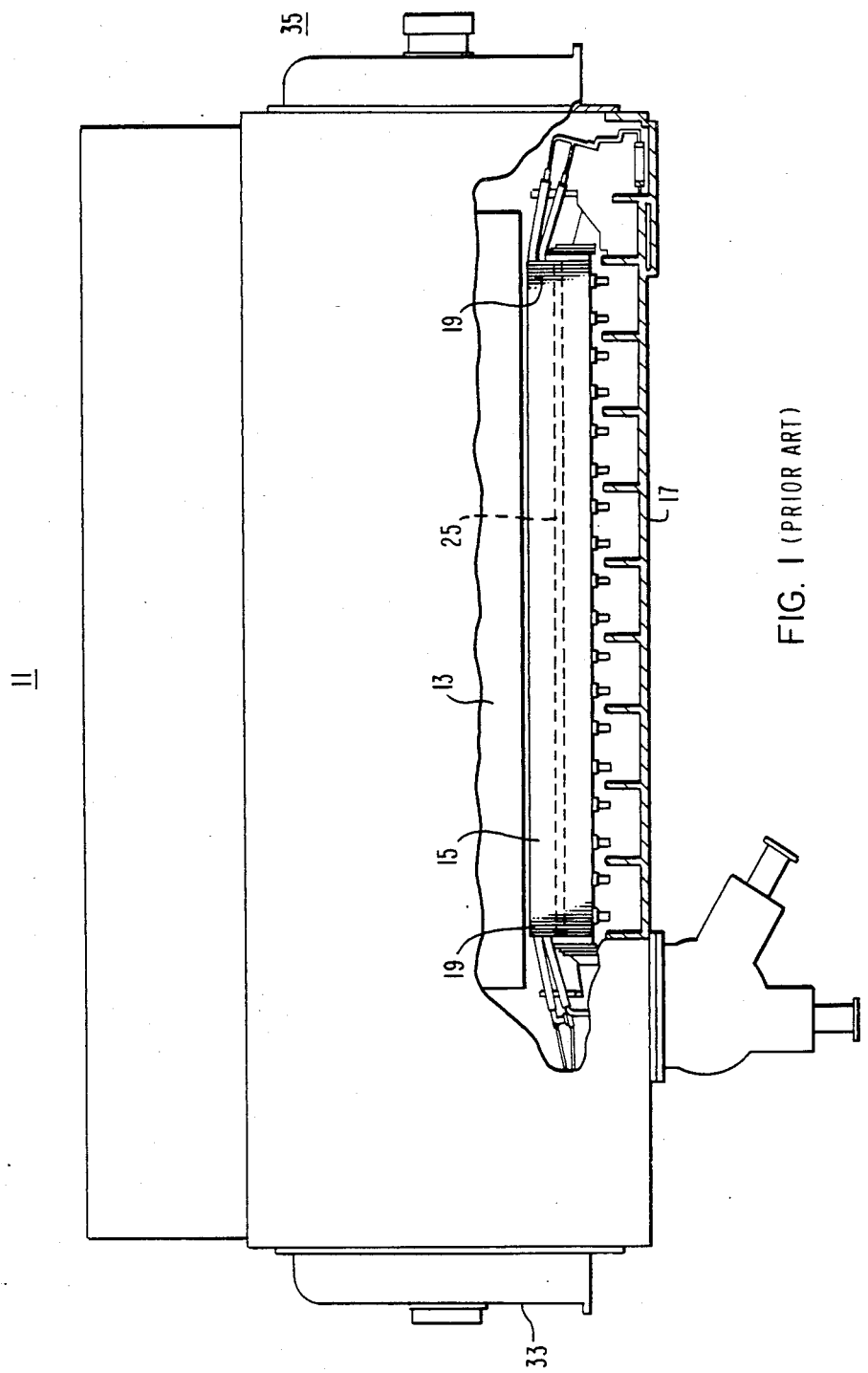
FIG. 1 is a simplified cross-sectional view of an electric generator taken along the axis of rotation.
Figure 2:
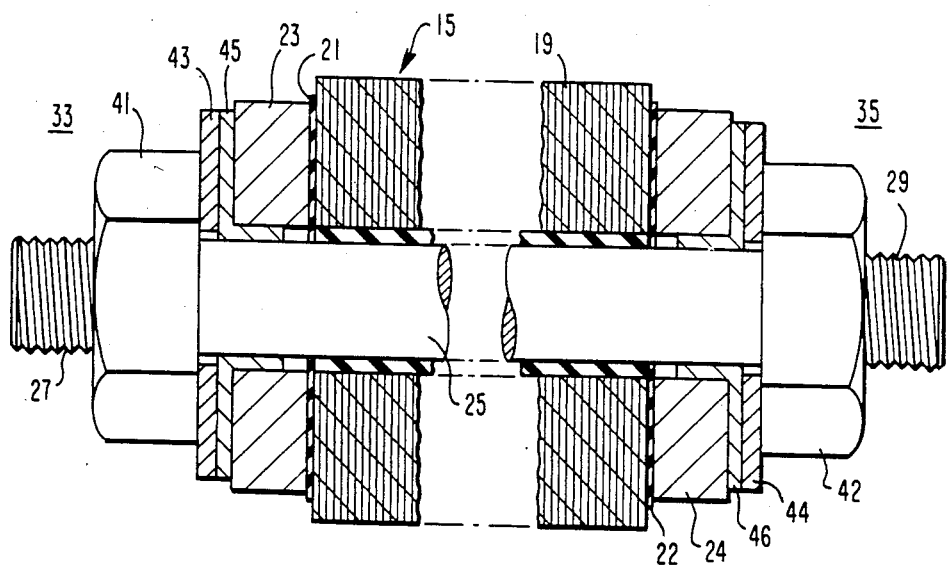
FIG. 2 is a partial view of the generator shown in FIG. 1, illustrating a prior art arrangement for tensioning stator core through-bolts.
Figure 3:
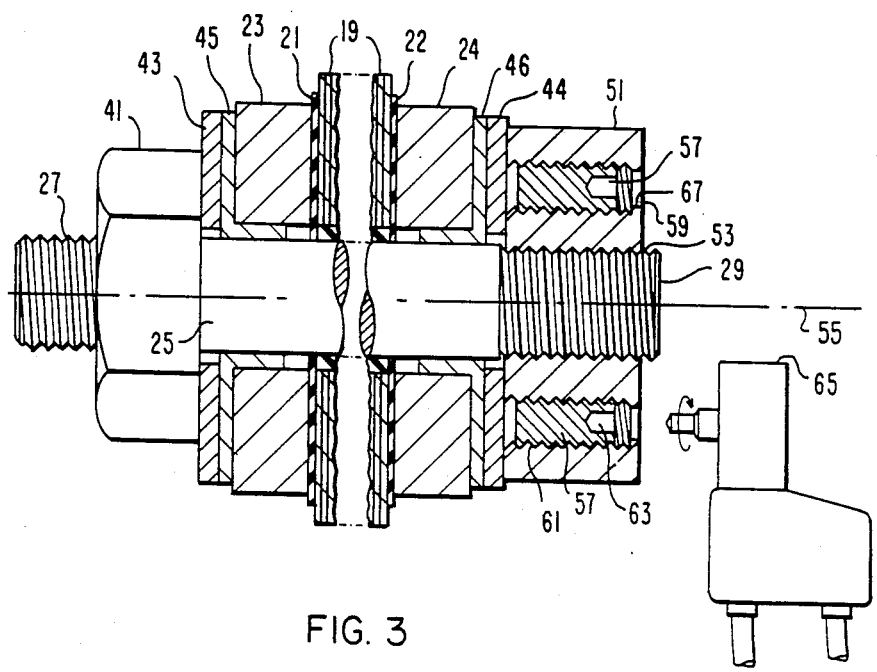
FIG. 3 illustrates, in a cross sectional view taken along the axis of rotation, an improved means for tensioning and retensioning the through-bolts in an electric generator stator core.
Figure 4:
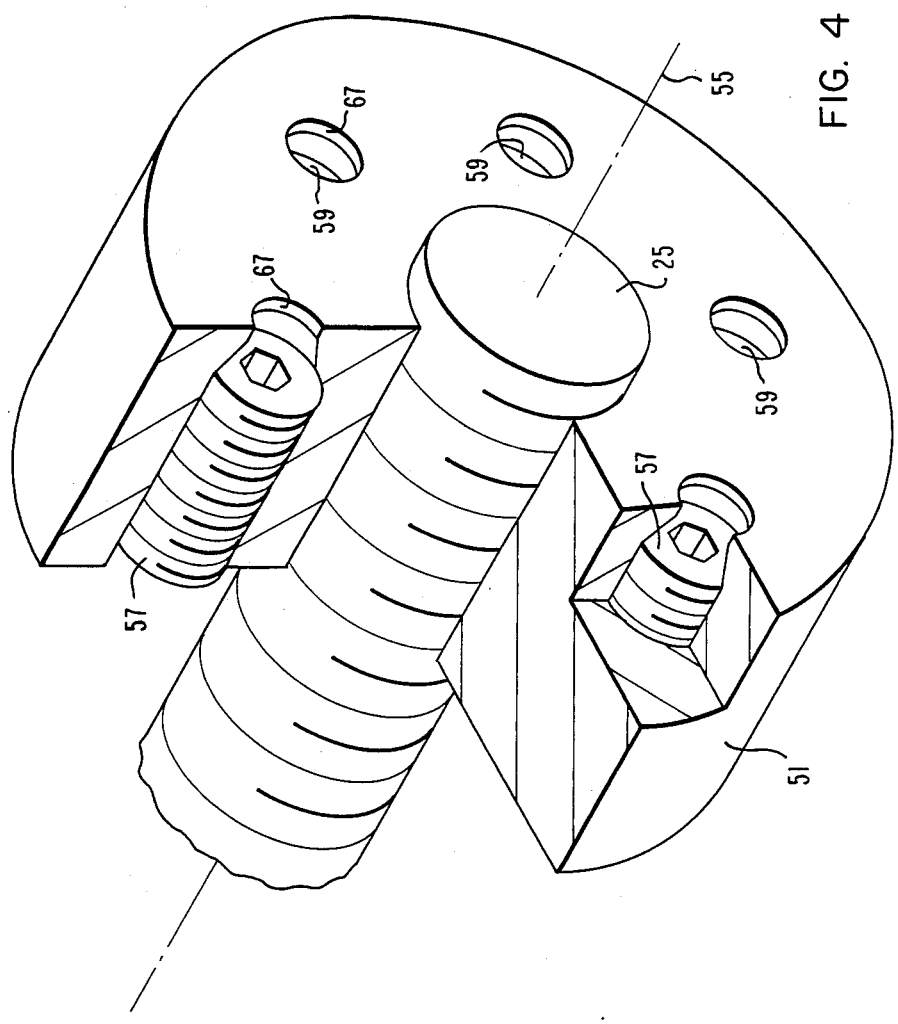
FIG. 4 is a perspective view illustrating a novel thrust nut for retensioning a stator core through-bolt.

With reference to FIGS. 3 and 4 there is illustrated according to the present invention a low-torque thrust nut 51, having a central threaded bore 53 positioned about a central axis 55 of a stator core through bolt 25 for tensioning and retensioning the through-bolt 25. The tensioned through-bolt 25 extends through the stator core 15 (partially illustrated in FIG. 3) to compress a plurality of stacked punchings 19. The punchings 19 are sandwiched between first and second insulation washers 21 and first and second steel compression plates 23. First and second threaded ends 27 and 29 of the bolt 25 extend outward through the insulation washers 21,22 and compression plates 23,24 for bolt tensioning. A tensioning nut 41, of the above described type utilized in the prior art, is threaded onto the first end 27 of the through-bolt 25 for stressing the bolt 25 with a tension tool (not illustrated). A first insulated bushing 45 and a steel washer 43 are interposed between the tensioning nut 41 and the first compression plate 23.

The thrust nut 51 is threaded on the second end 29 of the through-bolt 25 against a steel thrust washer 44. A second insulated bushing 46 is positioned between the second compression plate and the second washer 44. The thrust nut 51 includes a plurality of set screws 57, each positioned in a partially threaded set screw bore 59 for torquing against the second steel washer 44. Torquing the set screws stresses the through-bolt without requiring that the thrust nut be turned. The set screw bores 59 are disposed about the central bore 53, each bore 59 extending the entire length of the thrust nut 51. An inner end 61 of each set screw bore 59, facing the thrust washer 44, is threaded for passing a one of the set screws 57. Each threaded bore 59 may include a nylon or other type plastic insert (not illustrated) to prevent the set screws from backing out after they are torqued in place. An outer end 63 of each set screw 57 is adapted to receive a hex-wrench 65 for torquing the set screws 57 against the second washer 44.

Each set screw bore 59 includes an unthreaded outer end 67 which is diametrically smaller than the second set screw end 63. Thus, the set screws 57 are positionable in the bores 59 only through the inner bore ends 61 so that the set screws 57 are prevented from backing out through the second bore ends 67 after the thrust nut 51 is installed on the through-bolt 25. This assures confinement of the set screws 57 when the thrust nut 51 is subjected to large electromagnetic forces experienced during generator operation.

The method for tensioning the through-bolt 25 with the low-torque thrust nut during factory assembly is similar to the method for tensioning the through-bolt 25 with tensioning nuts 41,42 positioned at each end of the bolt 25. With the tensioning nut 41 threaded onto the first end 27 of the through-bolt 25 and the low-torque thrust nut 51 locked onto the second end 29 of the through-bolt 25, a tension tool (not illustrated) is threaded onto the first end 27 of the through-bolt 25 to stress the bolt 25. The tensioning nut 41 is then threaded inward and locked in place in order to remove any gaps between the tensioning nut 41 and the near end of stator core 15. Next the tension tool is removed so that the resulting through-bolt tension forces between the tension nut 41 and the low-torque thrust nut 51 compress the stator core punchings 19.

If the compression force on the stator core punchings 19 degrades in time due to normal generator operation, the through-bolt 25 may be retensioned with the low-torque thrust nut 51 according to a novel method. The through-bolt 25 is retensioned by merely torquing down the set screws 57 against the thrust washer 44 until a desired level of through-bolt tension is attained. The nylon inserts help to prevent the set screws 57 from backing out after being torqued in place. This method of retensioning the through-bolt 25 does not require turning of either the tension nut 41 or the novel low-torque thrust nut 51. Thus, the nuts 51 and 41 may be permanently locked in place during factory installation by deforming the threads on the nuts 51 and 41 as well as on the first and second bolt ends 27 and 29. With the low-torque thrust nut 51, this permanent nut locking prevents losses in compression forces on the punchings 19 during the installation process and does not affect through bolt retensioning.

A further advantage of the present method for retensioning the through-bolts 25 is that it overcomes many of the problems of limited access prevalent in many electric generators by allowing retensioning to be accomplished by tightening the relatively small, e.g. one half inch, set screws with a hand tool such as a hex-wrench 65.

The principles of the present invention having now been set forth it will be apparent to those skilled in the art that certain modifications in structure, components and arrangement of components illustrated herein may be made by the practice of the invention or the adaptation of the invention to specific electric generator designs without departing from the spirit and scope of the invention as defined by the claims which follow.

We claim:

1. A compression assembly for an electric generator stator core having a plurality of stacked punchings positioned between opposing first and second compression plates, comprising:

a through-bolt extending through the stacked punchings having a first threaded end extending outward from the stator core through the first compression plate and a second threaded end extending outward from the stator core through the second compression plate;

a tensioning nut threaded onto the first bolt end;

a thrust nut having a central threaded bore for threading onto the second bit end, said thrust nut including a plurality of set screws positioned in a corresponding plurality of threaded apertures distributed annularly about said thrust nut and extending therethrough parallel to the central bore for providing compression forces between said thrust nut and said tensioning nut when said set screws are tightened against the second compression plate;

a first washer positioned between said tensioning nut and the first compression plate along the first threaded bolt end;

a second washer positioned between said thrust nut and the second compression plate along the second threaded bolt end, said set screws positioned to apply compression forces against said second washer; and means for retaining each set screw in a set screw bore.

2. A compression assembly for an electric generator stator core having a plurality of stacked punchings positioned between opposing first and second compression plates, comprising:

a through-bolt extending through the stacked punchings having a first threaded end extending outward from the stator core through the first compression plate and a second threaded end extending outward from the stator core through the second compression plate;

a tensioning nut threaded onto the first bolt end;

a thrust nut having a central threaded bore for threading onto the second bolt end, said thrust nut including a plurality of set screws positioned in a corresponding plurality of threaded apertures distributed annularly about said thrust nut and extending therethrough parallel to the central bore for providing compression forces between said thrust nut and said tensioning nut when said set screws are tightened against the second compression plate; and means for retaining each set screw in a set screw bore.

3. The compression assembly of claim 2 wherein said retaining means comprises a reduced diameter opening of each set screw bore adjacent a head of each of said set screws.

4. The compression assembly of claim 3 further comprising a plastic insert positioned in each threaded set screw bore to prevent loosening of said set screws.

5. The compression assembly of claim 1 wherein said retaining means comprises a reduced diameter opening of each set screw bore adjacent a head of each of said set screws.

6. The compression assembly of claim 5 further comprising a plastic insert positioned in each threaded set screw bore to prevent loosening of said set screws.

* * * * *